United States Patent
Liou et al.

(10) Patent No.: US 11,200,858 B1
(45) Date of Patent: Dec. 14, 2021

(54) COLOR-CALIBRATION SYSTEM AND COLOR-CALIBRATION METHOD OF DISPLAY PANEL

(71) Applicant: Wistron Corp., New Taipei (TW)

(72) Inventors: Chang Lin Liou, New Taipei (TW); Hui Chuan Chen, New Taipei (TW); Kang-Ming Peng, New Taipei (TW)

(73) Assignee: WISTRON CORP., New Taipei (TW)

(*) Notice: Subject to any disclaimer, the term of this patent is extended or adjusted under 35 U.S.C. 154(b) by 0 days.

(21) Appl. No.: 17/144,397

(22) Filed: Jan. 8, 2021

(30) Foreign Application Priority Data

Sep. 28, 2020 (TW) .................................. 109133579

(51) Int. Cl.
*G09G 3/36* (2006.01)
*G01J 3/50* (2006.01)

(52) U.S. Cl.
CPC ............ *G09G 3/3607* (2013.01); *G01J 3/506* (2013.01); *G09G 2320/0666* (2013.01); *G09G 2320/0693* (2013.01); *G09G 2360/16* (2013.01)

(58) Field of Classification Search
CPC ......... G09G 3/3607; G09G 2320/0693; G09G 2320/0666; G09G 2360/16; G01J 3/506
See application file for complete search history.

(56) References Cited

U.S. PATENT DOCUMENTS

| 10,911,748 | B1* | 2/2021 | Molholm | G09G 3/2003 |
|---|---|---|---|---|
| 2013/0050504 | A1* | 2/2013 | Safaee-Rad | G09G 5/02 348/181 |
| 2016/0307485 | A1* | 10/2016 | Ma | G09G 3/36 |
| 2020/0126498 | A1* | 4/2020 | Li | G09G 3/3607 |

* cited by examiner

*Primary Examiner* — Kenneth B Lee, Jr.
(74) *Attorney, Agent, or Firm* — McClure, Qualey & Rodack, LLP

(57) ABSTRACT

A color-calibration system is provided, which includes a host, a reference display apparatus, and a display apparatus. The host calculates peak-intensity change rates relative to different gain values for blue, green, and red colors using a first spectrum and second spectrum of a first display panel of the reference display apparatus respectively in a first display mode and a second display mode. The host calculates peak-intensity ratios for blue, green, and red colors using the first spectrum and a third spectrum of the first display panel in a predetermined color-temperature display mode. The host calculates blue/green/red gains of a second display panel of the display apparatus using a fourth spectrum of the second display panel in the first display mode, the peak-intensity change rates, and peak-intensity ratios, so that the first display panel and the second display panel display a consistent color in the same predetermined color-temperature display mode.

20 Claims, 9 Drawing Sheets

```
                                    (A)
                                     ↓
┌─────────────────────────────────────────────────────────────┐
│ Respectively calculating a first peak-intensity change rate,│
│ a second peak-intensity change rate, and a third            │
│ peak-intensity change rate relative to a blue gain, a green │
│ gain, and a red gain at a first wavelength, a second        │──S508
│ wavelength, and a third wavelength corresponding to blue,   │
│ green, and red colors in the first spectrum and the second  │
│                         spectrum                            │
└─────────────────────────────────────────────────────────────┘
                                     ↓
┌─────────────────────────────────────────────────────────────┐
│ Measuring a third spectrum of the first display panel in a  │
│    predetermined color-temperature display mode, and        │
│        calculating a first peak-intensity ratio, a second   │
│      peak-intensity ratio, and a third peak-intensity ratio │──S510
│        respectively at the first wavelength, the second     │
│              wavelength, and the third wavelength           │
└─────────────────────────────────────────────────────────────┘
                                     ↓
┌─────────────────────────────────────────────────────────────┐
│ Measuring a fourth spectrum of the second display panel     │
│ in the first display mode, wherein the fourth spectrum has  │
│→│ a first peak intensity, a second peak intensity, and a third│──S512
│ peak intensity respectively at the first wavelength, the    │
│       second wavelength, and the third wavelength           │
└─────────────────────────────────────────────────────────────┘
                                     ↓
┌─────────────────────────────────────────────────────────────┐
│ Calculating a third blue gain, a third green gain, and a third│
│    red gain of the display apparatus in the predetermined   │
│ color-temperature display mode according to the first peak  │
│     intensity, the second peak intensity, the third peak    │
│     intensity, the first peak-intensity ratio, the second   │
│ peak-intensity ratio, the third peak-intensity ratio, the first│──S514
│     peak-intensity change rate, the second peak-intensity   │
│    change rate, and the third peak-intensity rate, and writing│
│    the third blue gain, the third green gain, and the third red│
│      gain into setting values of the display apparatus in the│
│          predetermined color-temperature display mode       │
└─────────────────────────────────────────────────────────────┘
                                     ↓
┌─────────────────────────────────────────────────────────────┐
│  Switching the predetermined color-temperature mode to      │──S516
│        another predetermined color temperature              │
└─────────────────────────────────────────────────────────────┘
```

FIG. 5A-2

COLOR-CALIBRATION SYSTEM AND COLOR-CALIBRATION METHOD OF DISPLAY PANEL

CROSS REFERENCE TO RELATED APPLICATIONS

This application claims priority of Taiwan Patent Application No. 109133579, filed on Sep. 28, 2020, the entirety of which is incorporated by reference herein.

BACKGROUND OF THE DISCLOSURE

Field of the Disclosure

The present disclosure relates to color calibration, and, in particular, to a color-calibration system and a color-calibration method of a display panel.

Description of the Related Art

For display apparatus manufacturers, display apparatuses of the same product number may use liquid-crystal display (LCD) panels with the same specifications (excluding backlight modules). Due to differences in materials and manufacturing-process technology, the spectrum of liquid-crystal display panels with the same specification produced by different panel manufacturers will be significantly different. Even if LCD panels of the same specification are produced by the same panel manufacturer, there will be slight differences in their spectra. As a result, when different display apparatuses of the same product number display the same picture under each predetermined color-temperature setting, the user will perceive different colors in the same picture.

In this case, if a color-calibration procedure is performed on two or more display apparatuses so that they can display the same screen under each color-temperature setting and present the same visual experience, it often requires a lot of calibration time on the factory side to adjust the color settings (e.g., blue, green, and red gain values) of each display apparatus. In addition, if the color calibration is performed for a specific color temperature, multiple display apparatuses may also show different colors in the same image at other predetermined color temperatures.

BRIEF SUMMARY OF THE DISCLOSURE

In view of the above, a color-calibration system and a color-calibration method of a display panel are provided to solve the aforementioned problem.

In an exemplary embodiment, a color-calibration system is provided. The color-calibration system includes a host, a reference display apparatus, and a display apparatus. The reference display apparatus includes a first display panel having a first liquid-crystal display panel and a first backlight module. The display apparatus includes a second display panel having a second liquid-crystal display panel and a second backlight module. The host measures a first spectrum and a second spectrum of the first display panel respectively in a first display mode and a second display mode by using a spectrometer. The host calculates a first peak-intensity change rate, a second peak-intensity change rate, and a third peak-intensity change rate relative to a blue gain, a green gain, and a red gain at a first wavelength, a second wavelength, and a third wavelength corresponding to blue, green, and red colors in the first spectrum and the second spectrum. The host measures a third spectrum of the first display panel in a predetermined color-temperature display mode by using the spectrometer, and calculates a first peak-intensity ratio, a second peak-intensity ratio, and a third peak-intensity ratio at the first wavelength, the second wavelength, and the third wavelength, wherein the host measures a fourth spectrum of the second display panel in the first display mode by using the spectrometer. The fourth spectrum has a first peak intensity, a second peak intensity, and a third peak intensity at the first wavelength, the second wavelength, and the third wavelength, wherein the host calculates a third blue gain, a third green gain, and a third red gain of the display apparatus in the predetermined color-temperature display mode according to the first peak intensity, the second peak intensity, the third peak intensity, the first peak-intensity ratio, the second peak-intensity ratio, the third peak-intensity ratio, the first peak-intensity change rate, the second peak-intensity change rate, and the third peak-intensity change rate. The host writes the third blue gain, the third green gain, and the third red gain into setting values of the display apparatus in the predetermined color-temperature display mode.

In some embodiments, the first blue gain, the second green gain, and the first red gain in the first display mode are a first value. The second blue gain, the second green gain, and the second red gain in the second display mode are a second value. The first value is greater than the second value.

In some embodiments, when the host calculates the third blue gain, the third green gain, and the third red gain of the display apparatus in the predetermined color-temperature display mode, the host multiplies the first peak intensity, the second peak intensity, and the third peak intensity of the fourth spectrum at the first wavelength, the second wavelength, and the third wavelength respectively by the first peak-intensity ratio, the second peak-intensity ratio, and the third peak-intensity ratio in the predetermined color-temperature display mode to obtain a fourth peak intensity, a fifth peak intensity, and a sixth peak intensity of the display apparatus in the predetermined color-temperature display mode at the first wavelength, the second wavelength, and the third wavelength.

In some embodiments, the host subtracts the fourth peak intensity, the fifth peak intensity, and the sixth peak intensity respectively from the first peak intensity, the second peak intensity, and the third peak intensity to obtain a first peak-intensity difference, a second peak-intensity difference, and a third peak-intensity difference.

In some embodiments, the host further multiplies the first peak-intensity difference, the second peak-intensity difference, and the third peak-intensity difference respectively by the first peak-intensity change rate, the second peak-intensity change rate, and the third peak-intensity change rate to obtain a first gain change amount, a second gain change amount, and a third gain change amount. The host further subtracts the first gain change amount, the second gain change amount, and the third gain change amount from the first value to respectively obtain the third gain, the third gain, and the third red gain of the display apparatus in the predetermined color-temperature display mode.

In some embodiments, before the host measures the first spectrum and the second spectrum of the first display panel in the first display mode and the second display mode by using the spectrometer, the host determines whether the first liquid-crystal panel and the second liquid-crystal panel have the same product number.

In some embodiments, in response to the first liquid-crystal panel and the second liquid-crystal not having the same product number, the host measures a to-be-tested spectrum of each one in a plurality of to-be-tested display panels in the first display mode by using the spectrometer, and determines whether the to-be-tested spectrum of each to-be-tested display panel is substantially close to the first spectrum. Each to-be-tested display panel includes the second liquid-crystal display panel and a backlight module, and the backlight module of each to-be-tested display panel is covered with a respective phosphor material. When the host determines whether the to-be-tested spectrum of each to-be-tested display panel is substantially close to the first spectrum, the host determines whether absolute values of intensity differences between the to-be-tested spectrum of each to-be-tested display panel and the first spectrum of the first display panel in the first display mode at the first wavelength, the second wavelength, and the third wavelength are smaller than a predetermined ratio. In response to the to-be-tested spectrum of a specific to-be-tested display panel being substantially close to the first spectrum, the host selects the specific to-be-tested display panel as the second display panel of the display apparatus.

In another exemplary embodiment, a color-calibration of a display panel for use in a color-calibration system is provided. The color-calibration system includes a reference display apparatus and a display apparatus, and the reference display apparatus includes a first display panel having a first liquid-crystal display panel and a first backlight module. The display apparatus includes a second display panel having a second liquid-crystal display panel and a second backlight module. The method includes the following steps: measuring a first spectrum and a second spectrum of the first display panel in a first display mode and a second display mode; calculating a first peak-intensity change rate, a second peak-intensity change rate, and a third peak-intensity change rate relative to a blue gain, a green gain, and a red gain at a first wavelength, a second wavelength, and a third wavelength corresponding to blue, green, and red colors in the first spectrum and the second spectrum; measuring a third spectrum of the first display panel in a predetermined color-temperature display mode, and calculating a first peak-intensity ratio, a second peak-intensity ratio, and a third peak-intensity ratio at the first wavelength, the second wavelength, and the third wavelength; measuring a fourth spectrum of the second display panel in the first display mode, wherein the fourth spectrum has a first peak intensity, a second peak intensity, and a third peak intensity at the first wavelength, the second wavelength, and the third wavelength; calculating a third blue gain, a third green gain, and a third red gain of the display apparatus in the predetermined color-temperature display mode according to the first peak intensity, the second peak intensity, the third peak intensity, the first peak-intensity ratio, the second peak-intensity ratio, the third peak-intensity ratio, the first peak-intensity change rate, the second peak-intensity change rate, and the third peak-intensity change rate; and writing the third blue gain, the third green gain, and the third red gain into setting values of the display apparatus in the predetermined color-temperature display mode.

BRIEF DESCRIPTION OF THE DRAWINGS

The present disclosure can be more fully understood by reading the subsequent detailed description and examples with references made to the accompanying drawings, wherein:

FIGS. 5A-1 and 5A-2 are portions of a flow chart of a color-calibration method of a display panel in accordance with an embodiment of the disclosure.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
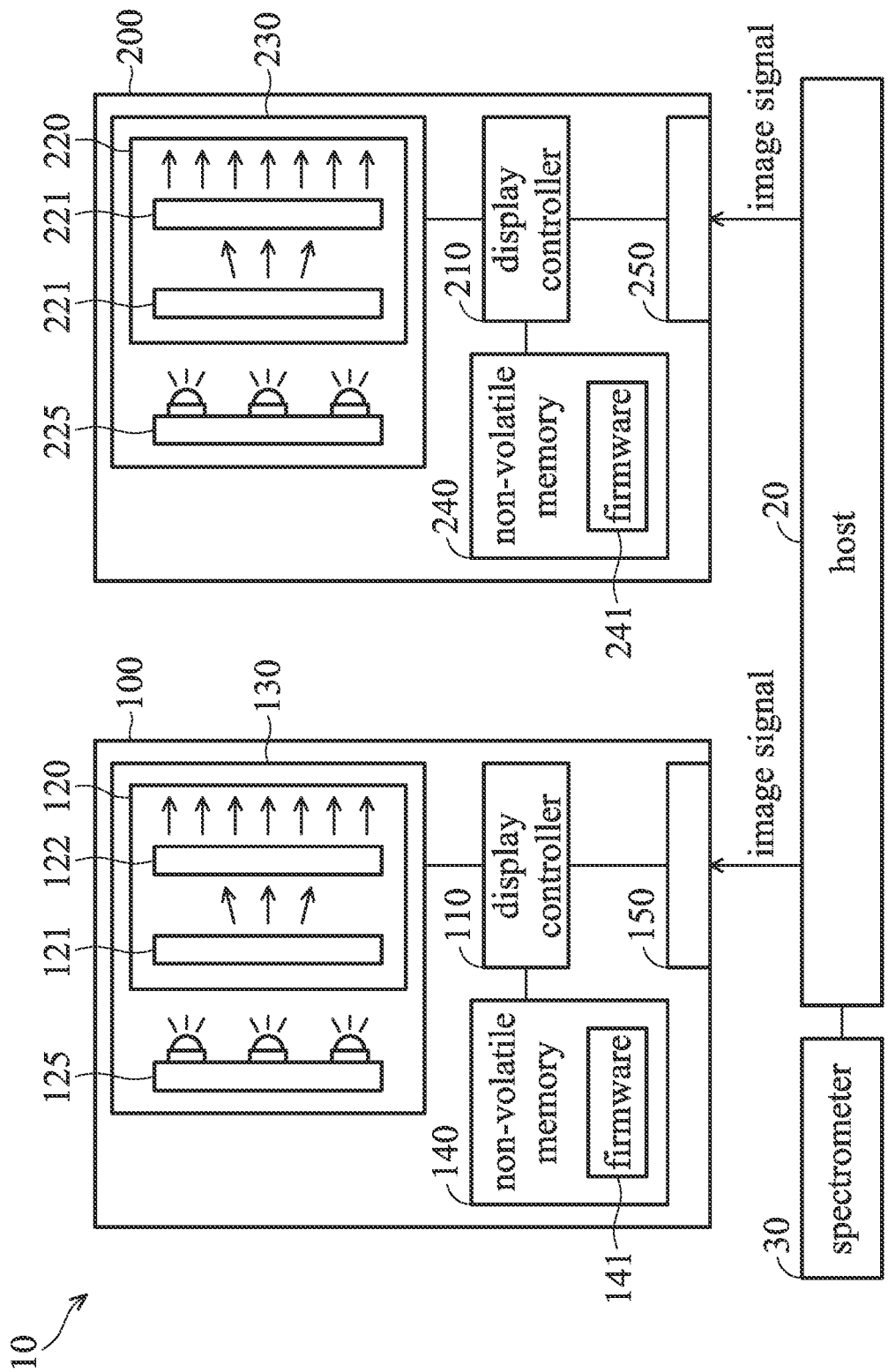
FIG. 1 is a block diagram of a color-calibration system in accordance with an embodiment of the disclosure.

FIG. 1 is a block diagram of a color-calibration system in accordance with an embodiment of the disclosure.

In an embodiment, the color-calibration system 10 may include a reference display apparatus 100 and one or more display apparatuses 200. The reference display apparatus 100 may include a display controller 110, a display panel 130, a non-volatile memory 140 and a display interface 150. The display controller 110 is configured to control operations and screen playback of the display apparatus 100. The display controller 110 may be, for example, an application-specific integrated circuit (ASIC), a system-on-chip (SoC), a processor, or a microcontroller, but the disclosure is not limited thereto.

The display panel 130 may include a liquid-crystal display panel 120 and a backlight module 125. The liquid-crystal display panel 120 can be regarded as an open cell or a liquid-crystal display module (LCM), which means that liquid-crystal display panel 120 is the portion of the display panel 130 excluding the backlight module 125. The liquid-crystal display panel 120 may include a color-filter array 121 and a liquid-crystal layer 122. The color-filter array 121 may include a plurality of red filters, a plurality of blue filters, and a plurality of green filters that are arranged in a predetermined pattern, and configured to filter red light, blue light, and green light from the light from the backlight module 125, and the filtered red light, blue light, and green light are provided to corresponding liquid-crystal cells to achieve the function of displaying images.

The overall spectrum of the display panel 130 is, for example, a result obtained by combining the spectrum of the liquid-crystal display panel 120 with the spectrum of the backlight module 125. The backlight module 125 is a light source for emitting light. The backlight module 125 may be realized by, for example, cold cathode fluorescent lamps (CCFLs), light-emitting diodes (LEDs), or electroluminescence (EL) technology, but the disclosure is not limited thereto.

The non-volatile memory 140 may be, for example, a read-only memory (ROM), an erasable programmable read-only memory (EPROM), an electrically erasable programmable read-only memory (EEPROM), but the disclosure is not limited thereto. The non-volatile memory 140 is configured to store firmware 141 or program code, which can display an on-screen display (OSD) interface on the display panel 130, so that the user can adjust the colors displayed by the reference display apparatus 100 via the OSD interface. The display controller 110 can read and execute the firmware 141 or program code from the non-volatile memory 140 to adjust the colors displayed by the reference display apparatus 100, such as the gain values of the red color, blue color, and green color, or color temperatures.

The display interface 150 may include, for example, a high-definition multimedia interface (HDMI), a DisplayPort (DP) interface, a Thunderbolt interface, a Universal Serial Bus (USB) Type-C interface, but the disclosure is not limited thereto. In addition, the display controller 110 can receive an image signal from a host 20 (e.g., a personal computer) via the display interface 150 (e.g., an HDMI interface), and display the image signal on the display panel 130 according to the color display settings defined in the firmware 141. For example, the display controller 110 can convert the image signal into the corresponding red, green, and blue gain values and the display controller 110 can control the liquid-crystal cells in the liquid-crystal layer 122 and adjust them to the corresponding liquid-crystal rotation angles according to the red, green, and blue gain values, so that the red light, green light, and blue light can pass through the liquid-crystal layer 122 sequentially and quantitatively for displaying the image signal.

In an embodiment, the display controller 110 may set the display panel to display a white screen, where the brightness of the red pixels, green pixels, and blue pixels are all 255, for example. Then, the display controller 110 can further switch the color-temperature setting of the display panel 130, such as switching between a plurality of predetermined color temperatures, wherein the predetermined color temperatures may include but not limited to 10000K, 9100K, 7500K, 6500K, 5700K, and 5000K. The spectrum of the display panel 130 at different predetermined color temperatures can be measured by a spectrometer 30, and the corresponding spectrum of each predetermined color-temperature display mode (e.g., curves 270 to 282) is shown in FIGS. 2A to 2F.

The spectrum of each predetermined color temperature measured by the spectrometer 30 is transmitted to the host 20, and the host 20 can analyze the spectrum curves in FIGS. 2A to 2F to obtain information about the gain values, peak wavelengths, and peak intensities of the blue, green, and red colors in each predetermined color temperature, as respectively shown in Tables 1 to 6.

TABLE 1

| Color | Gain | Peak Wavelength (nm) | Peak Intensity | Ratio |
|---|---|---|---|---|
| Blue(B) | 128 | 450 | 7.309988 | 2.411879 |
| Green(G) | 110 | 532 | 3.030827 | 1.734664 |
| Red(R) | 106 | 619 | 1.747213 | 0.239017 |

TABLE 2

| Color | Gain | Peak Wavelength (nm) | Peak Intensity | Ratio |
|---|---|---|---|---|
| Blue(B) | 128 | 450 | 7.310339 | 2.317584 |
| Green(G) | 112 | 532 | 3.154293 | 1.695009 |
| Red(R) | 109 | 619 | 1.86093 | 0.254561 |

TABLE 3

| Color | Gain | Peak Wavelength (nm) | Peak Intensity | Ratio |
|---|---|---|---|---|
| Blue(B) | 128 | 450 | 7.337912 | 2.019354 |
| Green(G) | 120 | 532 | 3.633792 | 1.52886 |
| Red(R) | 121 | 621 | 2.376798 | 0.323907 |

TABLE 4

| Color | Gain | Peak Wavelength (nm) | Peak Intensity | Ratio |
|---|---|---|---|---|
| Blue(B) | 126 | 451 | 6.990636 | 1.814224 |
| Green(G) | 123 | 532 | 3.853238 | 1.418914 |
| Red(R) | 128 | 619 | 2.715625 | 0.388466 |

TABLE 5

| Color | Gain | Peak Wavelength (nm) | Peak Intensity | Ratio |
|---|---|---|---|---|
| Blue(B) | 116 | 451 | 1.590187 | 1.590187 |
| Green(G) | 120 | 533 | 1.317556 | 1.317556 |
| Red(R) | 128 | 622 | 0.47729 | 0.47729 |

TABLE 6

| Color | Gain | Peak Wavelength (nm) | Peak Intensity | Ratio |
|---|---|---|---|---|
| Blue(B) | 103 | 451 | 4.346923 | 1.395242 |
| Green(G) | 113 | 533 | 3.115533 | 1.151472 |
| Red(R) | 128 | 624 | 2.705697 | 0.62244 |

Tables 1 to 6 can be used to calculate the corresponding peak-intensity ratios of blue, green, and red colors at different predetermined color temperatures. Under the same predetermined color temperature, the ratio of the blue color is the peak intensity of the blue color divided by the peak intensity of the green color, and the ratio of green color is the peak intensity of the green color divided by the peak intensity of the red color, and the ratio of the red color is the peak intensity divided by the peak intensity of the blue color.

In an embodiment, the display controller 110 can set the display panel 130 to enter the first display mode (e.g., a customized display mode), such as displaying a white screen (e.g., the brightness values of the red/blue/green pixels are all 255), and the red gain $R_{gain}$, blue gain $B_{gain}$, and green gain $G_{gain}$ are all 128, so it can be regarded that the display panel 130 is displayed in an extremely bright white screen. Similarly, the spectrometer 30 can be used to measure the spectrum of the display panel 130 in the first display mode, as shown by curve 270 in FIG. 2A. The spectrometer 30 may transmit the measured spectrum to the host 20 for analysis to obtain the data in Table 7.

TABLE 7

| Color | Gain | Peak Wavelength (nm) | Peak Intensity |
|---|---|---|---|
| Blue(B) | 128 | 450 | 7.373137 |
| Green(G) | 128 | 533 | 4.272644 |
| Red(R) | 128 | 622 | 2.733332 |

Then, the display controller 110 can set the display panel 130 to enter the first display mode, such as displaying a white screen, and the red gain $R_{gain}$, blue gain $B_{gain}$, and green gain $G_{gain}$ are all 100. Similarly, the spectrometer 30 can be used to measure the spectrum of the display panel 130 in the first display mode, as shown by curve 280 in FIG. 2F. The spectrometer 30 may transmit the measured spectrum to the host 20 for analysis to obtain the data in Table 8.

TABLE 8

| Color | Gain | Peak Wavelength (nm) | Peak Intensity |
|---|---|---|---|
| Blue(B) | 100 | 450 | 3.967139 |
| Green(G) | 100 | 533 | 2.356451 |
| Red(R) | 100 | 621 | 1.510444 |

For blue pixels, after the blue gain value is changed from 128 to 100, the peak-intensity difference is 7.373137−30967139=3.405998. Thus, the host 20 can calculate the blue-peak-intensity change rate $R_{peak\_B}$=3.405998/28= 0.121642786. Similarly, the host 20 can calculate the green-peak-intensity change rate $R_{peak\_G}$=(4.272644−2.356451)/28=0.068435464 and the red-peak-intensity change rate $R_{peak\_R}$=(2.733332−1.5104444)/28=0.043674571. The peak-intensity change rates of the blue, green, and red pixels can be regarded as the change rate of the peak-intensity difference relative to the gain-value difference, which means that the peak-intensity changes the amount when the change of the gain value is 1. It should be noted that the aforementioned embodiment uses the difference of the gain value being 28, and the disclosure can also use a greater difference of the gain value for calculation, so as to obtain a more accurate change rate of the peak-intensity difference relative to the gain-value difference.

In the embodiment, because the display panel 130 is displayed with extremely high brightness in the first display mode, the peak values $Peak_{CUS\_B}$, $Peak_{CUS\_G}$, and $Peak_{CUS\_R}$ of the blue, green, and red colors in the spectrum of the first display mode will be respectively greater than the peak values $Peak_{TEMP\_B}$, $Peak_{TEMP\_G}$, and $Peak_{TEMP\_R}$ of the blue, green, and red colors in the spectrum of each predetermined color temperature. Accordingly, the host 20 can calculate the peak-intensity ratio of the peak values $Peak_{TEMP\_B}$, $Peak_{TEMP\_G}$, and $Peak_{TEMP\_R}$ of the blue, green, and red colors in the spectrum of each predetermined color temperature respectively relative to the peak values $Peak_{CUS\_B}$, $Peak_{CUS\_G}$, and $Peak_{CUS\_R}$ of the blue, green, and red colors in the spectrum of the first display mode. For example, at a color temperature of 5000K, the peak-intensity ratio of the blue color $X_{peak\_B}$=($Peak_{5000K\_B}$/$Peak_{CUS\_B}$), the peak-intensity ratio of the green color $X_{peak\_G}$= ($Peak_{5000K\_G}$/$Peak_{CUS\_G}$), and the peak-intensity ratio of the red color $X_{peak\_R}$=($Peak_{5000K\_R}$/$Peak_{CUS\_R}$). The peak-intensity ratios $X_{peak\_B}$, $X_{peak\_G}$, and $X_{peak\_R}$ of the blue, green, and red colors at other predetermined color temperatures can be calculated in a similar manner.

The components in the display apparatus 200 corresponds to those in the reference display apparatus 100, and thus the details are not repeated here. The display apparatus 200 can be regarded as a device under test (DUT). In an embodiment, the reference display apparatus 100 and the display apparatus 200, for example, may be display apparatuses of the same product number, and they use display panels of the same product model produced by the same panel manufacturer. In another embodiment, the reference display apparatus 100 and the display apparatus 200 may be display apparatuses of the same product model, but they use display panels of the same type produced by different panel manufacturers.

For the convenience of description, the reference display apparatus 100 and the display apparatus 200 uses display panels of the same product model produced by the same panel manufacturer as an example. Specifically, the spectra of display panels of the same product model produced by the same panel manufacturer at each predetermined color temperature should be quite similar, but not necessarily the same. Thus, when adjusting the colors of the display apparatus 200, the spectrum information, peak-intensity ratios, and peak-intensity change rates corresponding to the reference display apparatus 100 described in the aforementioned embodiment can be directly used, so that the color displayed on the display apparatus 200 and reference display apparatus 100 at each predetermined color temperature can be consistent.

For example, the display controller 210 of the display apparatus 200 can set the display apparatus 200 to the first display mode (e.g., the customized display mode), such as playing a white screen, where the red gain $R_{gain}$, blue gain $B_{gain}$, and green gain $G_{gain}$ are all 128. Meanwhile, the spectrometer 30 can measure the spectrum of the display panel 230 of the display apparatus 200 in the first display mode, as shown in curve 310 of FIG. 3. When adjusting the color of the display apparatus 200 at each predetermined color temperature, it is necessary to use the peak-intensity ratios and peak-intensity change rates of the reference display apparatus 100 at each predetermined color temperature.

Taking a color temperature of 5000K as an example, the reference display apparatus 100 has a blue peak-intensity ratio $X_{peak\_B}$, green peak-intensity ratio $X_{peak\_G}$, and red peak-intensity ratio $X_{peak\_R}$. Since the reference display apparatus 100 and the display apparatus 200 use the same display panels, when the display apparatus 200 is switched from the customized display mode to the first display mode having a color temperature of 5000K, the change ratios of the peak values corresponding to the blue color (450 nm), green color (533 nm), and red color (619 nm) are similar to those shown in curves 280 to 270 in FIGS. 2A to 2F. Accordingly, if the peak intensities $Peak_{DUT\_CUS\_B}$, $Peak_{DUT\_CUS\_G}$, and $Peak_{DUT\_CUS\_R}$ corresponding to the blue color (450 nm), green color (533 nm), and red color (619 nm) of curve 310 are respectively multiplied with the blue peak-intensity ratio $X_{peak\_B}$, green peak-intensity ratio $X_{peak\_G}$, and red peak-intensity ratio $X_{peak\_R}$, the blue peak intensity $Peak_{DUT\_5000K\_B}$, green peak intensity $Peak_{DUT\_5000K\_G}$, and red peak intensity $Peak_{DUT\_5000\_R}$ of the display apparatus 200 at a color temperature of 5000K can be obtained.

Then, the host 20 may calculate the blue peak intensity difference $DIFF_{5000K\_B}$, green peak intensity difference $DIFF_{5000K\_G}$, and red peak intensity difference $DIFF_{5000K\_R}$ corresponding to the blue color (450 nm), green color (533 nm), and red color (619 nm). For example, the blue peak intensity $Peak_{DUT\_5000K\_B}$ at a color temperature of 5000K can be subtracted from the blue peak intensity $Peak_{DUT\_CUS\_B}$ of curve 310 to obtain the blue peak intensity difference $DIFF_{5000K\_B}$. Similarly, the green peak intensity $Peak_{DUT\_5000K\_G}$ at a color temperature of 5000K can be subtracted from the green peak intensity $Peak_{DUT\_CUS\_G}$ of curve 310 to obtain the green peak intensity difference $DIFF_{5000\_G}$. The red peak intensity $Peak_{DUT\_5000K\_R}$ at a color temperature of 5000K can be subtracted from the red peak intensity $Peak_{DUT\_CUS\_R}$ of curve 310 to obtain the red peak intensity difference $DIFF_{5000\_R}$.

Figure 2A:
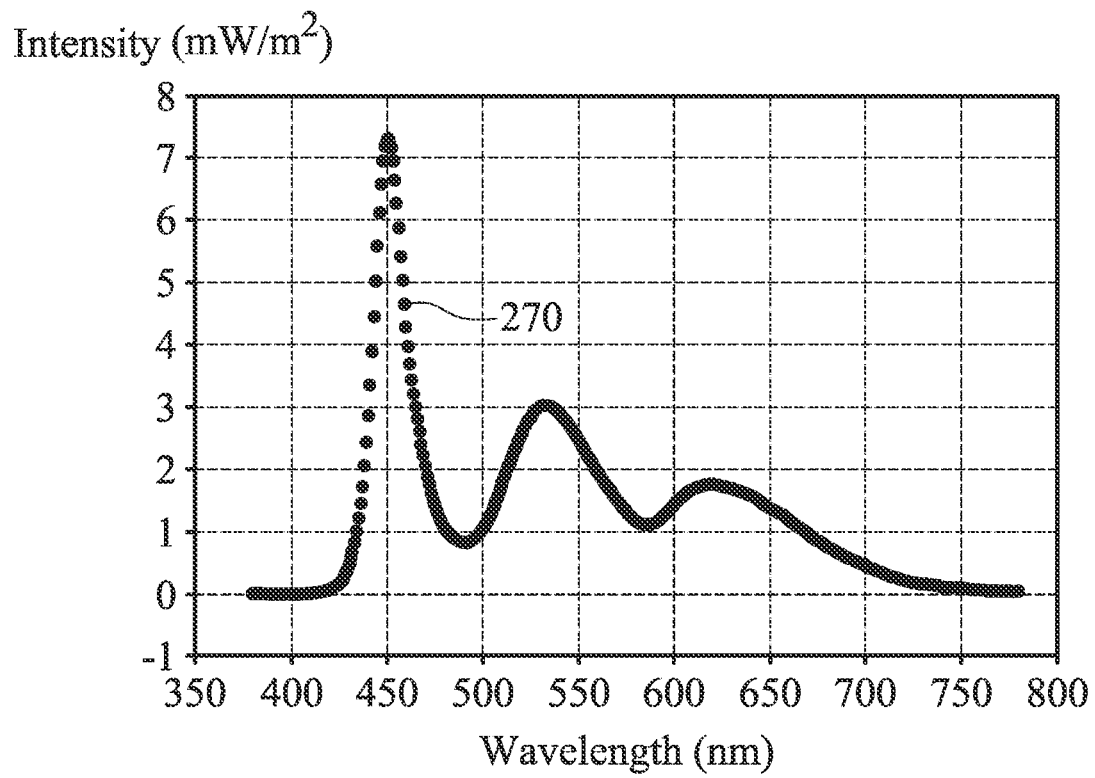
FIGS. 2A-2F are diagrams of spectrum curves of the display panel 130 in different predetermined color-temperature display modes in accordance with an embodiment of the disclosure.
Figure 2B:
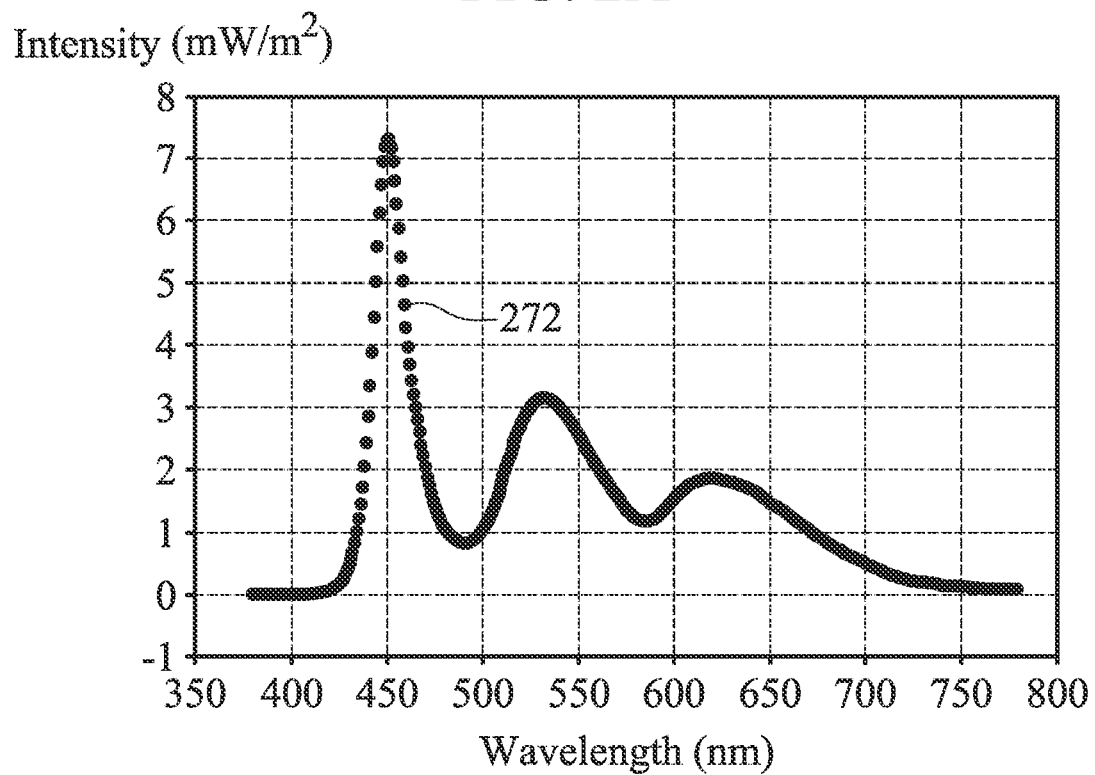
Figure 2C:
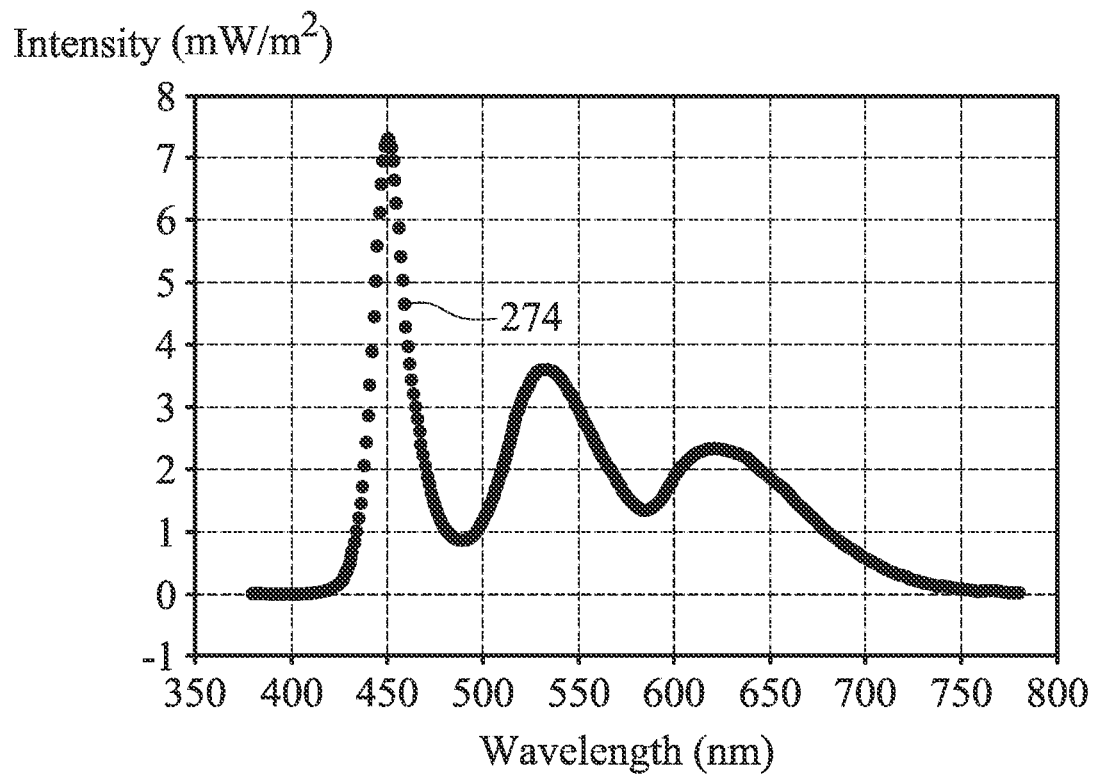
Figure 2D:
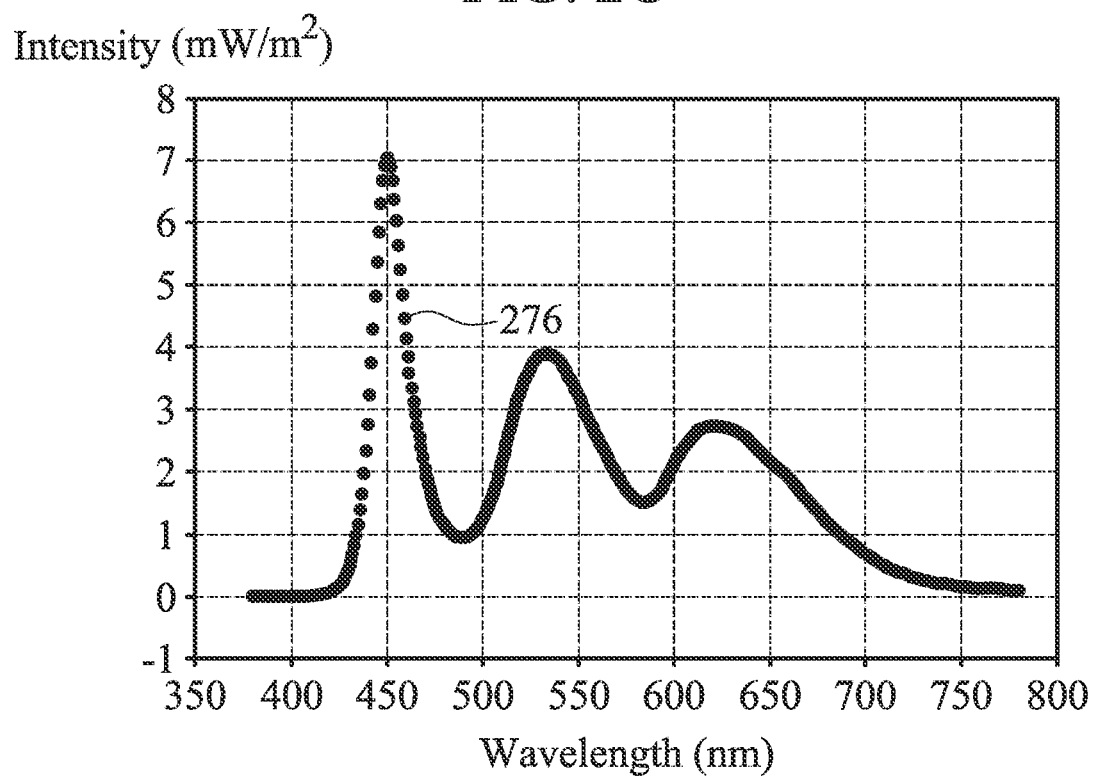
Figure 2E:
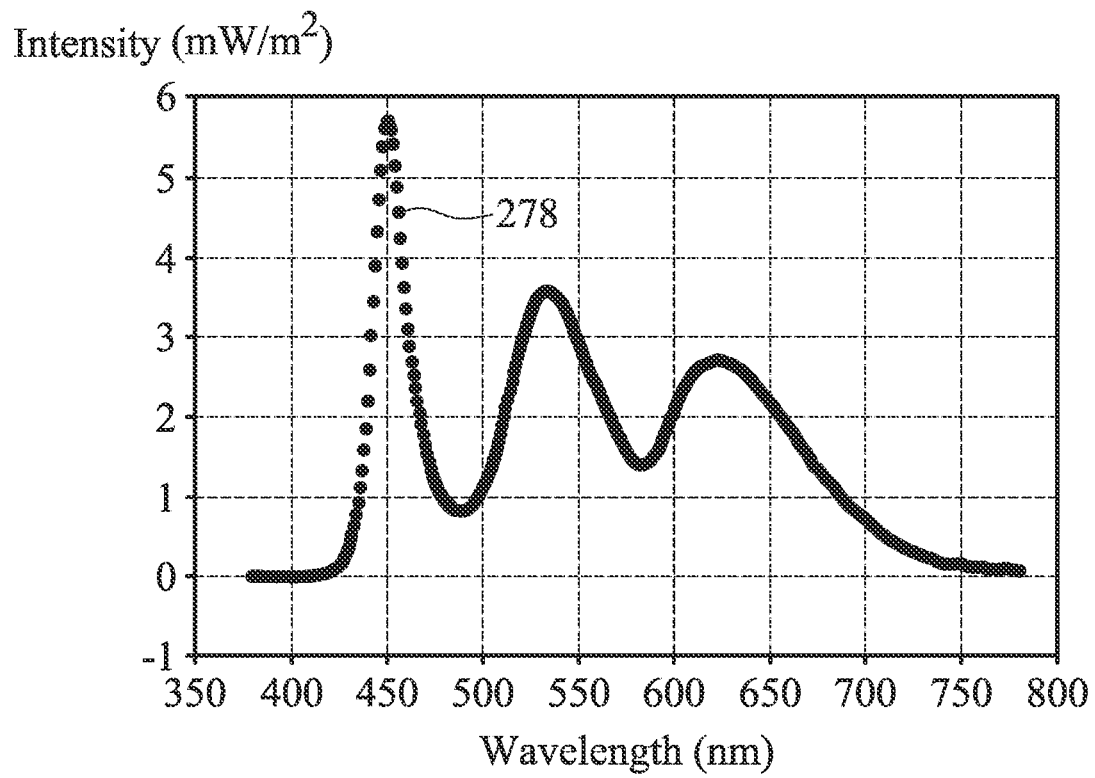
Figure 2F:
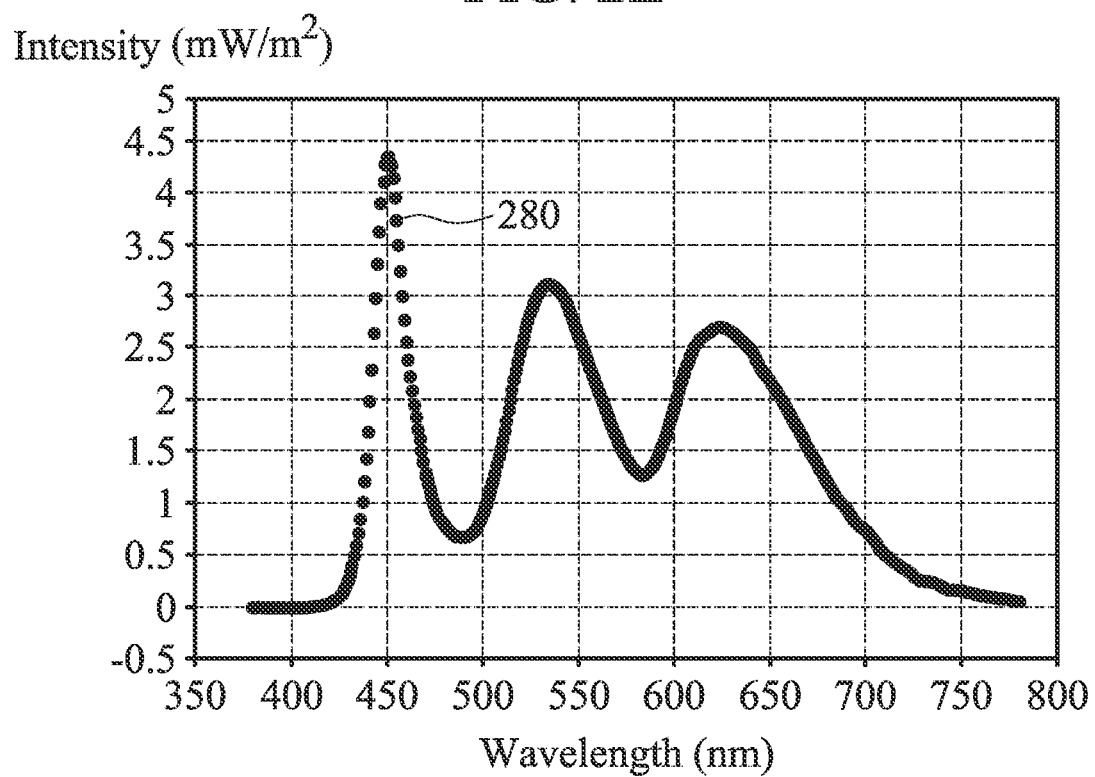

Then, the host 20 may calculate the blue gain, green gain, and red gain of the display apparatus 200 in the predetermined color-temperature display mode (e.g., a color temperature of 5000K). For example, the blue gain of curve 270 in FIG. 2A is 128, and the host 20 has previously calculated the peak-intensity change ratio $R_{peak\_B}$ of the blue pixels, so the host 20 can further calculate the blue gain change amount $V_B$ corresponding to the blue peak-intensity difference $DIFF_{5000K\_B}$, where $V_B=DIFF_{5000\_B}*R_{peak\_B}$. Accordingly, the host 20 can subtract the blue gain change amount $V_B$ from the blue gain of 128 to obtain the blue gain $B_{gain\_DUT\_5000K}$ of the display apparatus 200 at a color temperature of 5000K.

In a similar fashion, the host 20 can also calculate the green gain change amount $V_G$ corresponding to the green peak-intensity difference $DIFF_{5000K\_G}$, where $V_G=DIFF_{5000\_G}*R_{peak\_G}$. Accordingly, the host 20 can subtract the green gain change amount $V_G$ from the green gain of 128 to obtain the green gain $G_{gain\_DUT\_5000K}$ of the display apparatus 200 at a color temperature of 5000K. Similarly, the host 20 can also calculate the red gain change amount $V_R$ corresponding to the red peak-intensity difference $DIFF_{5000K\_R}$, where $V_R=DIFF_{5000\_R}*R_{peak\_R}$. Accordingly, the host 20 can subtract the red gain change amount $V_R$ from the red gain of 128 to obtain the red gain $R_{gain\_DUT\_5000K}$ of the display apparatus 200 at a color temperature of 5000K. Therefore, the host 200 can obtain the blue gain, green gain, and red gain of the display apparatus 200 at the temperature of 5000K, and write the blue gain, green gain, and red gain to the firmware 241 of the display apparatus 200 via a data-transmission channel (e.g., supporting the UART or USB protocols) to update the setting values of the predetermined color-temperature display mode at a color temperature of 5000K.

The aforementioned procedure describes how to calculate the blue gain, green gain, and red gain corresponding to the predetermined color-temperature display mode at a color temperature of 5000K. The blue gain, green gain, and red gain at other predetermined temperatures can be calculated in a similar manner. For example, the reference display apparatus 100 and the display apparatus 200 can be set to the predetermined color-temperature display mode of other predetermined temperature (e.g., 10000K, 9700K, 7500K, 6500K, or 5700K), and the aforementioned procedure can be repeated to obtain the blue gain, green gain, and red gain of the predetermined color-temperature display mode at other predetermined color temperature, and thus the details will be omitted here.

Figure 3:
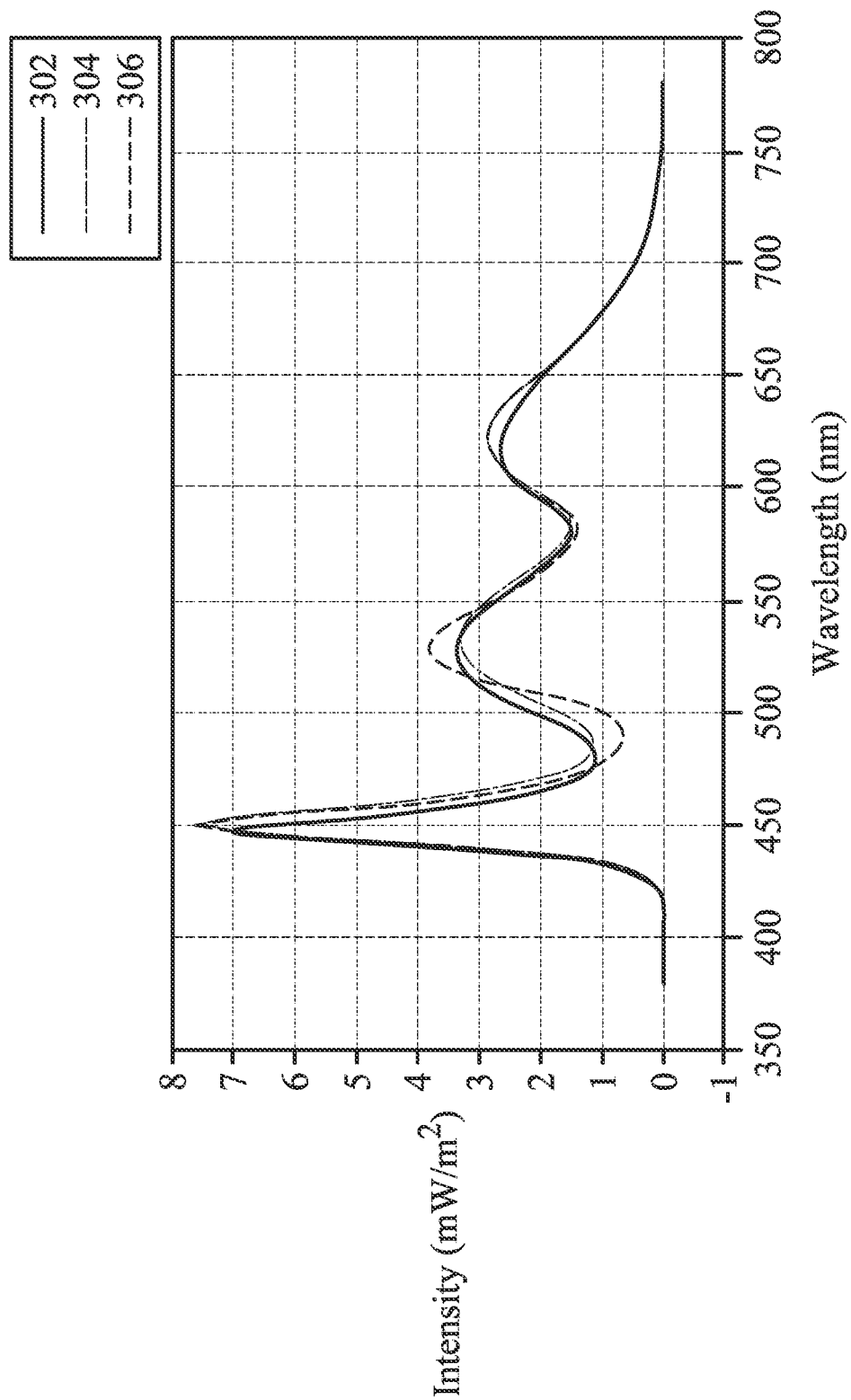
FIG. 3 is a diagram of the spectrum curve of the display panel 230 in the first display mode in accordance with an embodiment of the disclosure.

In another embodiment, the liquid-crystal display panel 220 of the display apparatus 200 and the liquid-crystal display panel 120 of the reference display apparatus 100 are liquid-crystal display panels of the same specification but different product models. Thus, there may be a significant difference between the spectra of the liquid-crystal display panels 220 and 120. For example, if there are three liquid-crystal display panels of the same specification but different product models, the corresponding spectra are shown in FIG. 3, where the spectrum curves 302, 304, and 306 are different from each other.

Specifically, if the liquid-crystal display panels 220 and 120 are respectively equipped with the same backlight module 225 and 125, the overall spectra of the display panels 230 and 130 will still be significantly different. However, the overall spectrum of a display panel is a combination of the spectrum of the liquid-crystal display panel and the spectrum of the backlight module. Thus, if different backlight modules 225 and 125 are respectively used for the liquid-crystal display panels 220 and 120, the overall spectra of the display panels 230 and 130 may be substantially similar to each other.

For example, the backlight modules 125 and 225 may be realized by CCFLs, LEDs, or EL technology. In the embodiment, the backlight modules 225 and 125 both use the same backlight technology. If the backlight modules 225 and 125 are implemented by CCFLs, the inside of the CCFLs needs to be coated with a phosphor material. If the backlight modules 225 and 125 are implemented by LEDs, the surfaces of the LEDs are coated with a phosphor material.

The color-calibration procedure of the display panel 230 of the display apparatus 200 is mainly to make the overall spectrum of the display panel 230 substantially similar to the overall spectrum of the display panel 130 of the reference display apparatus 100. For example, the spectra of the blue, green, and red light of the liquid-crystal display panel 120 are shown in the spectrum diagram 410, and the spectrum of the backlight module 125 is shown in the spectrum diagram 420. Accordingly, the overall spectrum of the display panel 130 obtained by combining the spectra of the liquid-crystal display panel 120 and backlight module 125 is shown by curve 452 in the spectrum diagram 450.

With regard to the display apparatus 200, the spectrum of the liquid-crystal display panel 220 is determined and cannot be changed when it is produced in the factory of the panel manufacturer, as shown in the spectrum diagram 430. However, the manufacturer of the display apparatus 200 can still select different backlight modules to be packaged with the liquid-crystal display panel 220 to obtain different display panels. Accordingly, the manufacturer of the display apparatus 200 may first obtain a plurality of phosphor materials (e.g., can be numbered from 1 to N), and coat each phosphor material on different backlight modules 225. Therefore, the spectrums of the backlight modules 225 are theoretically different from each other. For convenience of description, the spectrum of one of the backlight modules 225 is shown in the spectrum diagram 440.

Then, each of the backlight modules 225 coated with different phosphor materials is packaged with the liquid-crystal display panel 220 to obtain different to-be-tested display panels (e.g., can be numbered from 1 to N), and the spectrometer 30 can be used to measure the spectrum of each to-be-tested display panel. For example, when the liquid-crystal display panel 220 is packaged with the backlight module 225 having the spectrum shown in the spectrum diagram 440 to obtain a to-be-tested display panel, the spectrum of the to-be-tested display panel may be shown by curve 454 in the spectrum diagram 450. The host 20 may calculate the difference between the spectrum curve of each to-be-tested display panel having backlight modules 225 with different phosphor materials and the spectrum curve of the display panel 130, and determine whether the difference is smaller than a predetermined ratio.

For example, the host 20 can determine whether the absolute values of the intensity differences between the spectrum curve of each to-be-tested display panel and that of the display panel 130 corresponding to the blue, green, and red wavelengths are smaller than a predetermined ratio (e.g., 2%, not limited). When multiple to-be-tested display panels satisfy the aforementioned conditions, the host 20 can report the number of the to-be-tested display panel with the smallest intensity difference ratio at the wavelengths of the blue, green, and red colors, and select the to-be-tested display panel as the display panel 230 of the display apparatus 200. In some embodiments, in addition to the multiple predetermined wavelengths of the blue, green, and red colors, the host 20 can further determine whether the absolute values of the intensity differences between the spectrum curve of each to-be-tested display panel and that of the display panel 130 corresponding to the each of other predetermined wavelengths are smaller than the predetermined ratio.

Figure 4:
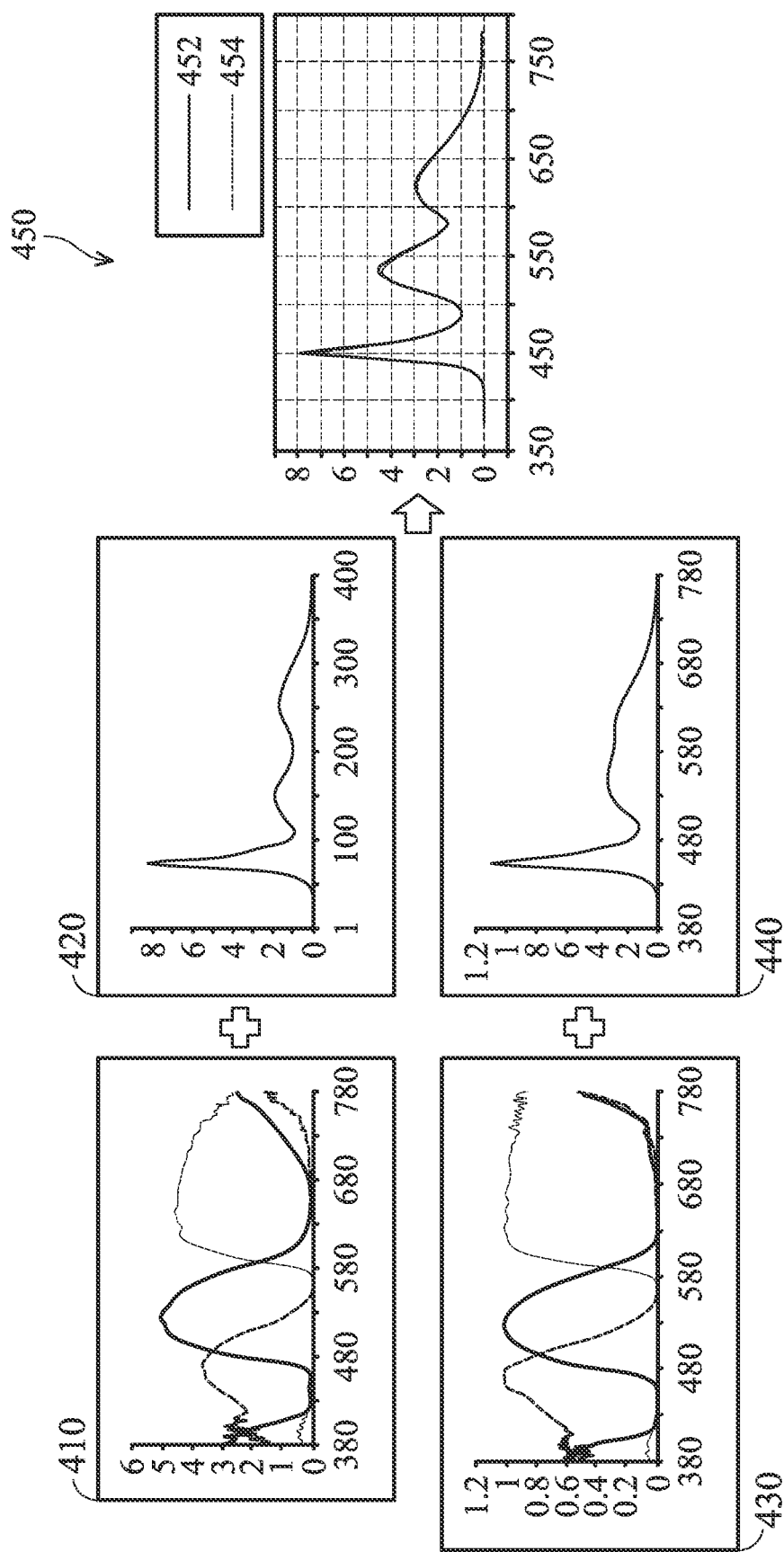
FIG. 4 is a diagram of the spectrum curves of different combinations of the liquid-crystal display panel, backlight module, and display panel in accordance with an embodiment of the disclosure.

In the embodiment of FIG. 4, since curve 454 is quite similar to curve 452, but there are still slight differences between curves 454 and 452, the to-be-tested display panel can be disposed in the display apparatus 200 as the display panel 230, and color calibration can be performed on the display apparatus 200 according to the color-calibration procedure of the display panel described in the embodiment of FIG. 1, so that the color displayed by the display apparatus 200 at each predetermined color temperature is consistent to the color displayed by the reference display apparatus 100 at each predetermined color temperature.

Figures 1, 5A:
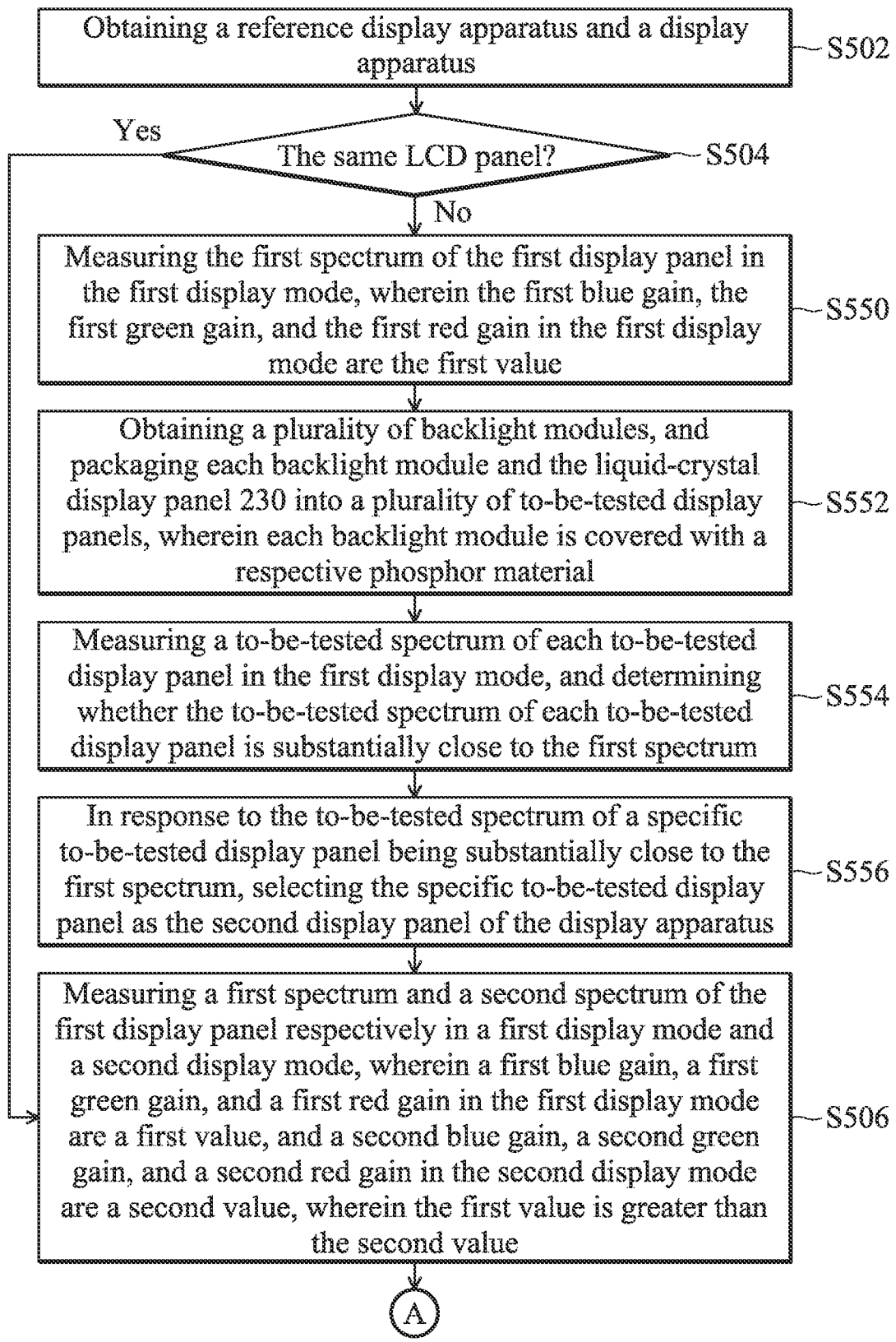

FIGS. 5A-1 and 5A-2 are portions of a flow chart of a color-calibration method of a display panel in accordance with an embodiment of the disclosure.

In step S502, a reference display apparatus 100 and a display apparatus 200 are obtained.

In step S504, it is determined whether a first liquid-crystal display panel (e.g., liquid-crystal display panel 120) of the reference display apparatus 100 and a second liquid-crystal display panel (e.g., liquid-crystal display panel 220) of the display apparatus 200 are the same (e.g., the same product model). If it is determined that the first liquid-crystal display panel and the second liquid-crystal display panel are the same, step S506 is performed. If it is determined that the first liquid-crystal display panel and the second liquid-crystal display panel are not the same, step S550 is performed.

In step S506, a first spectrum and a second spectrum of the first display panel respectively in a first display mode and a second display mode are measured (e.g., using the spectrometer 30), wherein a first blue gain, a first green gain, and a first red gain in the first display mode are a first value, and a second blue gain, a second green gain, and a second red gain in the second display mode are a second value, wherein the first value is greater than the second value.

In step S508, a first peak-intensity change rate, a second peak-intensity change rate, and a third peak-intensity change rate relative to a blue gain, a green gain, and a red gain at a first wavelength, a second wavelength, and a third wavelength corresponding to blue, green, and red colors in the first spectrum and the second spectrum are respectively calculated. For example, the host 20 can first calculate the gain difference values between the first value and the second value (i.e., the blue gain difference, green gain difference, and red gain difference), and calculate a blue peak-intensity difference, a green peak-intensity difference, and a red peak-intensity difference respectively at the first wavelength, the second wavelength, and the third wavelength. The host 20 may divide the blue peak-intensity difference, the green peak-intensity difference, and the red peak-intensity difference respectively by the gain difference values to obtain the first peak-intensity change rate, the second peak-intensity change rate, and the third peak-intensity change rate respectively relative to the blue gain, the green gain, and the red gain.

In step S510, a third spectrum of the first display panel in a predetermined color-temperature display mode is measured (e.g., using the spectrometer 30), and a first peak-intensity ratio, a second peak-intensity ratio, and a third peak-intensity ratio respectively at the first wavelength, the second wavelength, and the third wavelength are calculated.

In step S512, a fourth spectrum of the second display panel in the first display mode is measured, wherein the fourth spectrum has a first peak intensity, a second peak intensity, and a third peak intensity respectively at the first wavelength, the second wavelength, and the third wavelength.

In step S514, a third blue gain, a third green gain, and a third red gain of the display apparatus 200 in the predetermined color-temperature display mode are calculated according to the first peak intensity, the second peak intensity, the third peak intensity, the first peak-intensity ratio, the second peak-intensity ratio, the third peak-intensity ratio, the first peak-intensity change rate, the second peak-intensity change rate, and the third peak-intensity change rate, and the third blue gain, the third green gain, and the third red gain are written into the setting values of the display apparatus 200 in the predetermined color-temperature display mode.

In step S516, the predetermined color-temperature mode is switched to another predetermined color temperature, and steps S512 to S516 are repeated until the setting values of each predetermined color temperature of the display apparatus 200 have been written.

In step S550, the first spectrum of the first display panel in the first display mode is measured, wherein the first blue gain, the first green gain, and the first red gain in the first display mode are the first value.

In step S552, a plurality of backlight modules are obtained, and each backlight module and the liquid-crystal display panel 230 are packaged into a plurality of to-be-tested display panels, wherein each backlight module is covered with a respective phosphor material.

In step S554, a to-be-tested spectrum of each to-be-tested display panel in the first display mode is measured, and it is determined whether the to-be-tested spectrum of each to-be-tested display panel is substantially close to the first spectrum. For example, the host 20 can determine whether the absolute values of the intensity differences between the spectrum curve of each to-be-tested display panel and that of the display panel 130 corresponding to the blue, green, and red wavelengths are smaller than a predetermined ratio (e.g., 2%, not limited).

In step S556, in response to the to-be-tested spectrum of a specific to-be-tested display panel being substantially close to the first spectrum, the specific to-be-tested display panel is selected as the second display panel of the display apparatus 200.

Figure 5B:
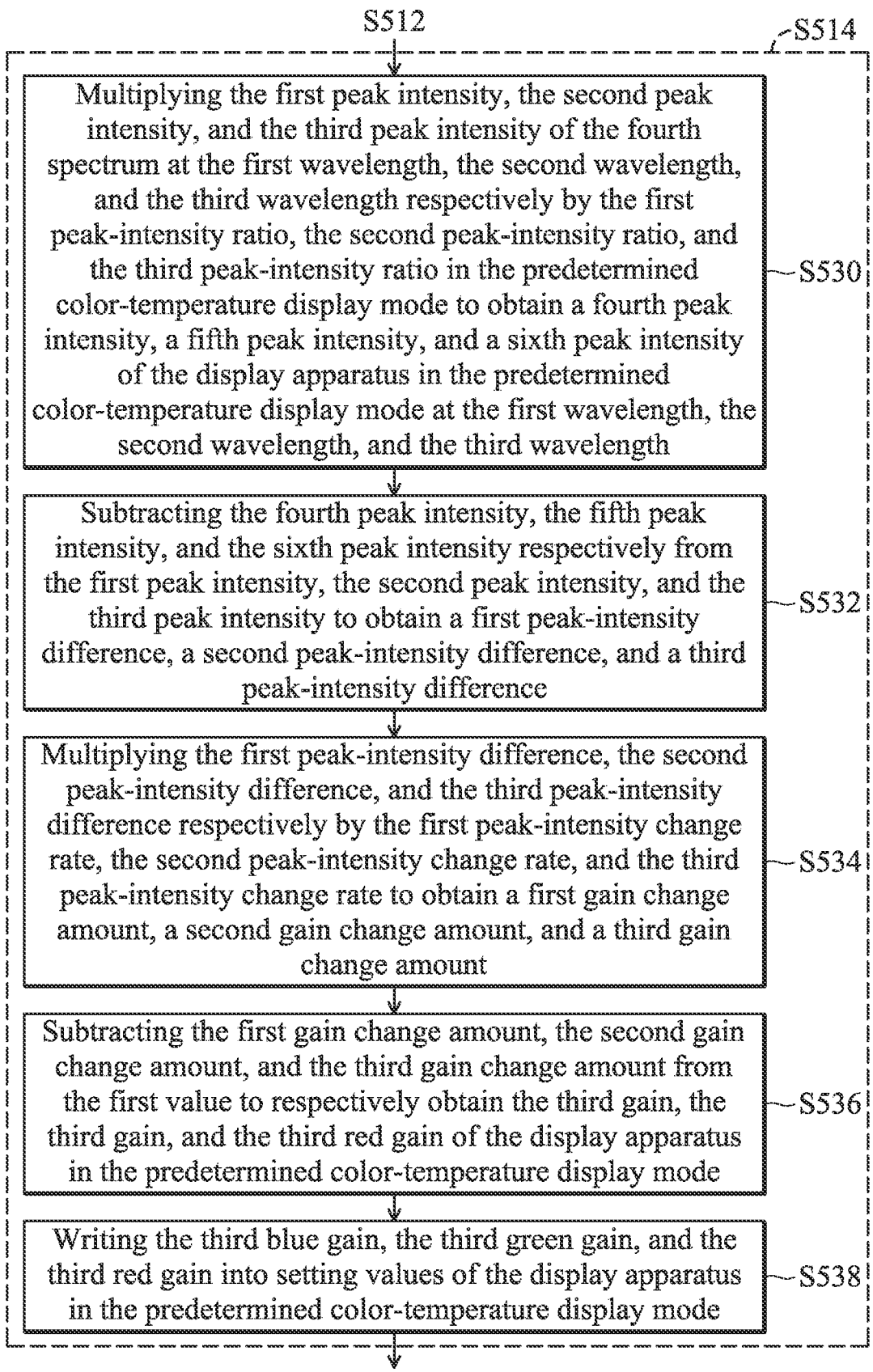
FIG. 5B is a flow chart of step S514 in accordance with the embodiment of FIGS. 5A-1 and 5A-2.

FIG. 5B is a flow chart of step S514 in accordance with the embodiment of FIGS. 5A-1 and 5A-2.

In step S530, the first peak intensity, the second peak intensity, and the third peak intensity of the fourth spectrum at the first wavelength, the second wavelength, and the third wavelength are respectively multiplied by the first peak-intensity ratio, the second peak-intensity ratio, and the third peak-intensity ratio in the predetermined color-temperature display mode to obtain a fourth peak intensity, a fifth peak intensity, and a sixth peak intensity of the display apparatus 200 in the predetermined color-temperature display mode at the first wavelength, the second wavelength, and the third wavelength.

In step S532, the fourth peak intensity, the fifth peak intensity, and the sixth peak intensity are respectively subtracted from the first peak intensity, the second peak intensity, and the third peak intensity to obtain a first peak-intensity difference, a second peak-intensity difference, and a third peak-intensity difference.

In step S534, the first peak-intensity difference, the second peak-intensity difference, and the third peak-intensity difference are respectively multiplied by the first peak-intensity change rate, the second peak-intensity change rate, and the third peak-intensity change rate to obtain a first gain change amount, a second gain change amount, and a third gain change amount.

In step S536, the first gain change amount, the second gain change amount, and the third gain change amount are subtracted from the first value to respectively obtain the third gain, the third gain, and the third red gain of the display apparatus 200 in the predetermined color-temperature display mode.

In step S538, the third blue gain, the third green gain, and the third red gain are written into the setting values of the display apparatus 200 in the predetermined color-temperature display mode. For example, the host 20 can write the third blue gain, the third green gain, and the third red gain to the firmware 241 of the display apparatus 200 to update the setting values of the display apparatus 200 in the predetermined color-temperature display mode.

In view of the above, a color-calibration system and a color-calibration method of a display panel are provided in the disclosure, which are capable of calculating peak-intensity change rates relative to different gains at the wavelengths of blue, green, and red colors in the first spectrum in the first display mode and the second spectrum in the second display mode, and calculating peak-intensity ratios at the wavelengths of the blue, green, and red colors in the first spectrum in the first display mode and the third spectrum in the predetermined color-temperature display mode. Accordingly, the fourth spectrum of the second display panel in the first display mode can be used to calculate the blue gain, green gain, and red gain of the second display panel in the predetermined color-temperature display mode, so the first display panel and the second display panel can display a consistent color in the same predetermined color-temperature display mode.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color-calibration system, comprising:
    a host;
    a reference display apparatus, comprising: a first display panel, wherein the first display panel comprises a first liquid-crystal display panel and a first backlight module; and
    a display apparatus, comprising: a second display panel, wherein the second display panel comprises a second liquid-crystal display panel and a second backlight module,
    wherein the host measures a first spectrum and a second spectrum of the first display panel respectively in a first display mode and a second display mode by using a spectrometer,
    wherein the host calculates a first peak-intensity change rate, a second peak-intensity change rate, and a third peak-intensity change rate relative to a blue gain, a green gain, and a red gain at a first wavelength, a second wavelength, and a third wavelength corresponding to blue, green, and red colors in the first spectrum and the second spectrum,
    wherein the host measures a third spectrum of the first display panel in a predetermined color-temperature display mode by using the spectrometer, and calculates a first peak-intensity ratio, a second peak-intensity ratio, and a third peak-intensity ratio at the first wavelength, the second wavelength, and the third wavelength,
    wherein the host measures a fourth spectrum of the second display panel in the first display mode by using the spectrometer, wherein the fourth spectrum has a first peak intensity, a second peak intensity, and a third peak intensity at the first wavelength, the second wavelength, and the third wavelength,
    wherein the host calculates a third blue gain, a third green gain, and a third red gain of the display apparatus in the predetermined color-temperature display mode according to the first peak intensity, the second peak intensity, the third peak intensity, the first peak-intensity ratio, the second peak-intensity ratio, the third peak-intensity ratio, the first peak-intensity change rate, the second peak-intensity change rate, and the third peak-intensity change rate,
    wherein the host writes the third blue gain, the third green gain, and the third red gain into setting values of the display apparatus in the predetermined color-temperature display mode.

2. The color-calibration system as claimed in claim 1, wherein the first blue gain, the second green gain, and the first red gain in the first display mode are all a first value,
    wherein the second blue gain, the second green gain, and the second red gain in the second display mode are all a second value, and the first value is greater than the second value.

3. The color-calibration system as claimed in claim 2, wherein when the host calculates the third blue gain, the third green gain, and the third red gain of the display apparatus in the predetermined color-temperature display mode, the host multiplies the first peak intensity, the second peak intensity, and the third peak intensity of the fourth spectrum at the first wavelength, the second wavelength, and the third wavelength respectively by the first peak-intensity ratio, the second peak-intensity ratio, and the third peak-intensity ratio in the predetermined color-temperature display mode to obtain a fourth peak intensity, a fifth peak intensity, and a sixth peak intensity of the display apparatus in the predetermined color-temperature display mode at the first wavelength, the second wavelength, and the third wavelength.

4. The color-calibration system as claimed in claim 3, wherein the host subtracts the fourth peak intensity, the fifth peak intensity, and the sixth peak intensity respectively from the first peak intensity, the second peak intensity, and the third peak intensity to obtain a first peak-intensity difference, a second peak-intensity difference, and a third peak-intensity difference.

5. The color-calibration system as claimed in claim 4, wherein the host further multiplies the first peak-intensity difference, the second peak-intensity difference, and the third peak-intensity difference respectively by the first peak-intensity change rate, the second peak-intensity change rate, and the third peak-intensity change rate to obtain a first gain change amount, a second gain change amount, and a third gain change amount.

6. The color-calibration system as claimed in claim 5, wherein the host further subtracts the first gain change amount, the second gain change amount, and the third gain change amount from a first value to respectively obtain the third blue gain, the third green gain, and the third red gain of the display apparatus in the predetermined color-temperature display mode.

7. The color-calibration system as claimed in claim 1, wherein before the host measures the first spectrum and the second spectrum of the first display panel in the first display mode and the second display mode by using the spectrometer, the host determines whether the first liquid-crystal panel and the second liquid-crystal panel have the same product number.

8. The color-calibration system as claimed in claim 7, wherein in response to the first liquid-crystal panel and the second liquid-crystal not having the same product number, the host measures a to-be-tested spectrum of each one in a plurality of to-be-tested display panels in the first display mode by using the spectrometer, and determines whether the to-be-tested spectrum of each to-be-tested display panel is substantially close to the first spectrum,
wherein each to-be-tested display panel comprises the second liquid-crystal display panel and a backlight module, and the backlight module of each to-be-tested display panel is covered with a respective phosphor material.

9. The color-calibration system as claimed in claim 8, wherein when the host determines whether the to-be-tested spectrum of each to-be-tested display panel is substantially close to the first spectrum, the host determines whether absolute values of intensity differences between the to-be-tested spectrum of each to-be-tested display panel and the first spectrum of the first display panel in the first display mode at the first wavelength, the second wavelength, and the third wavelength are smaller than a predetermined ratio.

10. The color-calibration system as claimed in claim 8, wherein in response to the to-be-tested spectrum of a specific to-be-tested display panel being substantially close to the first spectrum, the host selects the specific to-be-tested display panel as the second display panel of the display apparatus.

11. A color-calibration method of a display panel, for use in a color-calibration system, wherein the color-calibration system comprises a reference display apparatus and a display apparatus, and the reference display apparatus comprises a first display panel having a first liquid-crystal display panel and a first backlight module, wherein the display apparatus comprises a second display panel having a second liquid-crystal display panel and a second backlight module, the method comprising:
measuring a first spectrum and a second spectrum of the first display panel in a first display mode and a second display mode;
calculating a first peak-intensity change rate, a second peak-intensity change rate, and a third peak-intensity change rate relative to a blue gain, a green gain, and a red gain at a first wavelength, a second wavelength, and a third wavelength corresponding to blue, green, and red colors in the first spectrum and the second spectrum;
measuring a third spectrum of the first display panel in a predetermined color-temperature display mode, and calculating a first peak-intensity ratio, a second peak-intensity ratio, and a third peak-intensity ratio at the first wavelength, the second wavelength, and the third wavelength;
measuring a fourth spectrum of the second display panel in the first display mode, wherein the fourth spectrum has a first peak intensity, a second peak intensity, and a third peak intensity at the first wavelength, the second wavelength, and the third wavelength;
calculating a third blue gain, a third green gain, and a third red gain of the display apparatus in the predetermined color-temperature display mode according to the first peak intensity, the second peak intensity, the third peak intensity, the first peak-intensity ratio, the second peak-intensity ratio, the third peak-intensity ratio, the first peak-intensity change rate, the second peak-intensity change rate, and the third peak-intensity change rate; and
writing the third blue gain, the third green gain, and the third red gain into setting values of the display apparatus in the predetermined color-temperature display mode.

12. The method as claimed in claim 11, wherein the first blue gain, the second green gain, and the first red gain in the first display mode are a first value,
wherein the second blue gain, the second green gain, and the second red gain in the second display mode are a second value, and the first value is greater than the second value.

13. The method as claimed in claim 12, wherein the step of calculating the third blue gain, the third green gain, and the third red gain of the display apparatus in the predetermined color-temperature display mode comprises: multiplying the first peak intensity, the second peak intensity, and the third peak intensity of the fourth spectrum at the first wavelength, the second wavelength, and the third wavelength respectively by the first peak-intensity ratio, the second peak-intensity ratio, and the third peak-intensity ratio in the predetermined color-temperature display mode to obtain a fourth peak intensity, a fifth peak intensity, and a sixth peak intensity of the display apparatus in the predetermined color-temperature display mode at the first wavelength, the second wavelength, and the third wavelength.

14. The method as claimed in claim 13, wherein the step of calculating the third blue gain, the third green gain, and the third red gain of the display apparatus in the predetermined color-temperature display mode comprises:
subtracting the fourth peak intensity, the fifth peak intensity, and the sixth peak intensity respectively from the first peak intensity, the second peak intensity, and the third peak intensity to obtain a first peak-intensity difference, a second peak-intensity difference, and a third peak-intensity difference.

15. The method as claimed in claim 14, wherein the step of calculating the third blue gain, the third green gain, and the third red gain of the display apparatus in the predetermined color-temperature display mode further comprises:

multiplying the first peak-intensity difference, the second peak-intensity difference, and the third peak-intensity difference respectively by the first peak-intensity change rate, the second peak-intensity change rate, and the third peak-intensity change rate to obtain a first gain change amount, a second gain change amount, and a third gain change amount.

16. The method as claimed in claim 15, wherein the step of calculating the third blue gain, the third green gain, and the third red gain of the display apparatus in the predetermined color-temperature display mode further comprises:

subtracting the first gain change amount, the second gain change amount, and the third gain change amount from the first value to respectively obtain the third blue gain, the third green gain, and the third red gain of the display apparatus in the predetermined color-temperature display mode.

17. The method as claimed in claim 11, wherein before measuring the first spectrum and the second spectrum of the first display panel in the first display mode and the second display mode, the method comprises: determining whether the first liquid-crystal panel and the second liquid-crystal panel have the same product number.

18. The method as claimed in claim 17, wherein before measuring the first spectrum and the second spectrum of the first display panel in the first display mode and the second display mode, the method further comprises:

in response to the first liquid-crystal display panel and the second liquid-crystal display panel not having the same product number, measuring a to-be-tested spectrum of each one in a plurality of to-be-tested display panels in the first display mode, and determining whether the to-be-tested spectrum of each to-be-tested display panel is close to the first spectrum, wherein each to-be-tested display panel comprises the second liquid-crystal display panel and a backlight module, and the backlight module of each to-be-tested display panel is covered with a respective phosphor material.

19. The method as claimed in claim 18, wherein before measuring the first spectrum and the second spectrum of the first display panel in the first display mode and the second display mode, the method further comprises:

in response to the to-be-tested spectrum of a specific to-be-tested display panel being substantially close to the first spectrum, selecting the specific to-be-tested display panel as the second display panel of the display apparatus.

20. The method as claimed in claim 18, wherein the step of determining whether the to-be-tested spectrum of each to-be-tested display panel is substantially close to the first spectrum comprises:

determining whether absolute values of intensity differences between the to-be-tested spectrum of each to-be-tested display panel and the first spectrum of the first display panel in the first display mode at the first wavelength, the second wavelength, and the third wavelength are smaller than a predetermined ratio.

\* \* \* \* \*